United States Patent
Kollé et al.

(10) Patent No.: US 8,607,896 B2
(45) Date of Patent: Dec. 17, 2013

(54) JET TURBODRILL

(75) Inventors: Jack Kollé, Seattle, WA (US); Kenneth Theimer, Auburn, WA (US)

(73) Assignee: Tempress Technologies, Inc., Kent, WA (US)

( * ) Notice: Subject to any disclaimer, the term of this patent is extended or adjusted under 35 U.S.C. 154(b) by 255 days.

(21) Appl. No.: 12/796,602

(22) Filed: Jun. 8, 2010

(65) Prior Publication Data
US 2010/0307833 A1 Dec. 9, 2010

Related U.S. Application Data (60) Provisional application No. 61/185,162, filed on Jun. 8, 2009.

(51) Int. Cl.
*E21B 4/00* (2006.01)

(52) U.S. Cl.
USPC .......................................... 175/107; 175/317

(58) Field of Classification Search
USPC ........... 175/317, 107; 415/202, 145, 131, 903
See application file for complete search history.

(56) References Cited

U.S. PATENT DOCUMENTS

| | | | |
|---|---|---|---|
| 699,273 A | 5/1902 | Wolski | |
| 1,963,090 A | 6/1934 | Jakosky | |
| 2,342,732 A | 2/1944 | Gudmundsen | |
| 2,359,629 A | 10/1944 | Dexter et al. | |
| 2,388,741 A | 11/1945 | Hays | |
| 2,421,769 A | 6/1947 | Wolfe | |
| 2,445,803 A | 7/1948 | Rogers | |
| 2,492,605 A | 12/1949 | Varney et al. | |
| 2,535,079 A | 12/1950 | Lebert | |
| 2,543,063 A | 2/1951 | Rodgers | |
| 2,562,721 A | 7/1951 | Jakosky | |
| 2,562,724 A | 7/1951 | Lebert | |
| 2,743,083 A | 4/1956 | Zublin | |

(Continued)

FOREIGN PATENT DOCUMENTS

| | | | |
|---|---|---|---|
| DE | 1568680 | 6/1980 | ............ E21B 21/00 |
| RU | 587240 | 10/1972 | ............ E21B 37/00 |

OTHER PUBLICATIONS

Borland et al., "Drill Bit Seismic, Vertical Seismic Profiling, and Seismic Depth Imaging to Aid Drilling Decisions in the Tho Tinh Structure Nam Con Son Basin—Vietnam." *Butsuri-Tansa* vol. 51, No. 1: 27-44, 1998.

(Continued)

*Primary Examiner* — Jennifer H Gay
*Assistant Examiner* — Taras P Bemko
(74) *Attorney, Agent, or Firm* — Morgan, Lewis & Bockius LLP (57) ABSTRACT

A turbine drill motor capable of operation at ultra-high rotary speeds (i.e., in excess of 1000 rpm, which is very high for turbine drill motors), with a high-pressure jet-assist functionality for drilling and well service applications. The ultra-high rotary speed enables fast penetration with diamond bits, while the high-pressure jet-assist ensures adequate cooling and cuttings removal. In an exemplary embodiment, such a turbine drill motor includes a bypass channel to divert a portion of the driving fluid supply when the bit is off-bottom, to limit the no-load runaway speed of the turbine. Serial and parallel flow paths can be accommodated, and different drill bits for cutting and well-bore servicing are disclosed.

16 Claims, 7 Drawing Sheets

(56) References Cited

U.S. PATENT DOCUMENTS

| | | | |
|---|---|---|---|
| 2,963,099 A | 7/1957 | Gianelloni, Jr. | 175/25 |
| 2,855,671 A | 10/1958 | Lundgren et al. | |
| 2,865,602 A * | 12/1958 | Whittle | 175/107 |
| 2,902,258 A | 9/1959 | Hildebrant | |
| 3,054,595 A | 9/1962 | Kaufmann | 415/107 |
| 3,058,510 A | 10/1962 | Tiraspolsky et al. | 415/107 |
| 3,065,805 A | 11/1962 | Martini | 175/56 |
| 3,433,489 A | 3/1969 | Wiese | 277/74 |
| 3,441,094 A | 4/1969 | Gallo et al. | 175/56 |
| 3,520,225 A | 7/1970 | Baugh | |
| 3,568,783 A | 3/1971 | Chenoweth | 175/92 |
| 3,606,410 A | 9/1971 | Inserra | 403/13 |
| 3,648,786 A | 3/1972 | Chenoweth | 175/56 |
| 3,648,789 A | 3/1972 | Eriksson | 175/292 |
| 3,655,424 A | 4/1972 | Orowan | 117/68.5 |
| 3,728,040 A | 4/1973 | Ioanesian et al. | 415/123 |
| 3,802,515 A | 4/1974 | Flamand et al. | 173/176 |
| 3,810,637 A | 5/1974 | Bonvin | 277/96 |
| 3,964,558 A * | 6/1976 | Fogle | 175/107 |
| 4,033,429 A | 7/1977 | Farr | 181/106 |
| 4,114,703 A | 9/1978 | Matson, Jr. et al. | 175/107 |
| 4,190,202 A | 2/1980 | Yie | 239/101 |
| 4,196,911 A | 4/1980 | Matsushita | 277/401 |
| 4,213,332 A | 7/1980 | Bonomo et al. | 73/862.14 |
| 4,225,000 A | 9/1980 | Mauer | 175/107 |
| 4,246,976 A | 1/1981 | McDonald, Jr. | 175/107 |
| 4,324,299 A | 4/1982 | Nagel | 175/107 |
| 4,418,721 A | 12/1983 | Holmes | 137/810 |
| 4,437,525 A | 3/1984 | O'Hanlon et al. | 175/218 |
| 4,440,242 A | 4/1984 | Schmidt et al. | |
| 4,454,935 A | 6/1984 | Pryor | 188/296 |
| 4,493,381 A | 1/1985 | Kajikawa et al. | 175/107 |
| 4,521,167 A | 6/1985 | Cavalleri et al. | 418/82 |
| 4,529,046 A | 7/1985 | Schmidt et al. | 175/107 |
| 4,573,637 A | 3/1986 | Pater et al. | 239/11 |
| 4,665,997 A | 5/1987 | Maurer et al. | 175/107 |
| 4,715,538 A | 12/1987 | Lingnau | 239/248 |
| 4,747,544 A | 5/1988 | Kränzle et al. | 239/251 |
| 4,762,277 A | 8/1988 | Pater et al. | 239/99 |
| 4,784,231 A * | 11/1988 | Higgins | 175/340 |
| 4,790,393 A | 12/1988 | Larronde et al. | 175/40 |
| 4,817,739 A | 4/1989 | Jeter | 175/38 |
| 4,819,745 A | 4/1989 | Walter | 175/107 |
| 4,821,961 A | 4/1989 | Shook | 239/253 |
| 4,830,122 A | 5/1989 | Walter | 175/107 |
| 4,862,043 A | 8/1989 | Zieve | 318/114 |
| 4,863,101 A | 9/1989 | Pater et al. | 239/99 |
| 4,890,682 A | 1/1990 | Worrall et al. | 175/61 |
| 4,905,775 A | 3/1990 | Warren et al. | 175/45 |
| 4,923,120 A | 5/1990 | Hammelmann | 239/252 |
| 4,925,510 A | 5/1990 | Hojo et al. | 156/92 |
| 4,928,509 A | 5/1990 | Nakamura | 72/61 |
| 4,934,254 A | 6/1990 | Clark et al. | 277/96.2 |
| 4,979,577 A | 12/1990 | Walter | 175/56 |
| 4,997,159 A | 3/1991 | Yoshino et al. | 251/29 |
| 5,000,516 A | 3/1991 | Kollé et al. | 299/16 |
| 5,009,272 A | 4/1991 | Walter | 175/56 |
| 5,028,004 A | 7/1991 | Hammelmann | 239/120 |
| 5,051,020 A | 9/1991 | Schleicher | 403/282 |
| 5,121,537 A | 6/1992 | Matsui et al. | 29/522.1 |
| 5,190,114 A | 3/1993 | Walter | 175/56 |
| 5,191,557 A | 3/1993 | Rector et al. | 367/41 |
| 5,222,425 A | 6/1993 | Davies | 91/273 |
| 5,279,262 A | 1/1994 | Muehleck | 122/26 |
| 5,382,760 A | 1/1995 | Staron et al. | 181/121 |
| 5,396,965 A | 3/1995 | Hall et al. | 173/73 |
| 5,603,385 A | 2/1997 | Colebrook | 175/45 |
| 5,641,027 A * | 6/1997 | Foster | 175/107 |
| 5,685,487 A | 11/1997 | Ellis | 239/261 |
| 5,703,421 A | 12/1997 | Durkin | 310/61 |
| 5,740,127 A | 4/1998 | Van Steenwyk et al. | 367/85 |
| 5,803,188 A | 9/1998 | McInnes | 175/92 |
| 5,909,848 A | 6/1999 | Zink | 239/252 |
| 5,909,879 A | 6/1999 | Simpson | 277/399 |
| 5,938,206 A | 8/1999 | Klosterman et al. | 277/399 |
| 5,950,736 A | 9/1999 | Goldstein | 175/1 |
| 5,953,809 A | 9/1999 | Kowalski | 29/521 |
| 6,027,040 A | 2/2000 | Frye-Hammelmann | 239/252 |
| 6,053,261 A | 4/2000 | Walter | 175/234 |
| 6,062,311 A | 5/2000 | Johnson et al. | 166/312 |
| 6,094,401 A | 7/2000 | Masak et al. | 367/84 |
| 6,191,511 B1 | 2/2001 | Zysset | 310/60 A |
| 6,237,701 B1 | 5/2001 | Kollé et al. | 175/1 |
| 6,263,969 B1 | 7/2001 | Stoesz et al. | 166/334.4 |
| 6,301,766 B1 | 10/2001 | Kollé | 29/421.2 |
| 6,347,675 B1 | 2/2002 | Kolle | 175/57 |
| 6,394,221 B2 | 5/2002 | Cosma | 181/113 |
| 6,453,996 B1 | 9/2002 | Carmichael et al. | 166/177.3 |
| 6,557,856 B1 | 5/2003 | Azibert et al. | 277/401 |
| 6,774,519 B2 | 8/2004 | Pullen et al. | 310/156.28 |
| 6,952,068 B2 | 10/2005 | Gieras et al. | 310/254 |
| 6,964,270 B2 | 11/2005 | Janssen et al. | 123/568.13 |
| 7,139,219 B2 | 11/2006 | Kollé et al. | 166/373 |
| 7,198,456 B2 | 4/2007 | Kollé et al. | 415/82 |
| 7,201,238 B2 | 4/2007 | Marvin et al. | 175/67 |
| 7,310,580 B2 | 12/2007 | Zhou et al. | 702/6 |
| 7,524,160 B2 | 4/2009 | Kollé et al. | 415/1 |
| 2001/0030486 A1 | 10/2001 | Pijanowski | 310/254 |
| 2004/0069530 A1 | 4/2004 | Prain et al. | 367/83 |

OTHER PUBLICATIONS

Kollé, Jack K., "A Comparison of Water Jet, Abrasive Jet and Rotary Diamond Drilling in Hard Rock." Presentation for Energy Sources Technology Conference & Exhibition (ETCE '98), Houston, TX: 6pp., Feb. 2-4, 1998.

Kollé, Jack K., "Moving an Ice Mountain." *Mechanical Engineering*: 49-53, Feb. 1990.

Park et al., "Swept impact seismic techniques (SIST)." *Geophysics*, vol. 61, No. 6: 1789-1803, Nov.-Dec. 1996.

Rector et al., "The use of drill-bit energy as a downhole seismic source." *Geophysics* vol. 56. No. 5:628-634, May 1991.

* cited by examiner

JET TURBODRILL

RELATED APPLICATIONS

This application is based on a prior provisional application, Ser. No. 61/185,162, filed on Jun. 8, 2009, the benefit of the filing date of which is hereby claimed under 35 U.S.C. §119(e).

BACKGROUND

Hard rock drilling of deep wells is typically carried out using a rotary drill string. The rotation speed of a drill string is limited to around 150 rpm, and this technique requires a heavy drill pipe to carry the load and to apply high thrust to the rock. Drill motors operate at a relatively higher rotary speed, and provide faster drilling rates as compared to rotary drilling Positive displacement motors are used for geothermal drilling, but these tools incorporate elastomeric stators that degrade at high temperatures.

Mud turbines (turbodrills) offer higher rotary speeds, up to 1000 rpm, which improves the rate of penetration (ROP) of bits with small cutter exposure. These mud turbines are also capable of operating under high temperature conditions, with a greater service life than the positive displacement motors employing elastomeric stators. Recent developments in bearings have dramatically improved motor life in mud turbines, allowing runs of hundreds of hours. Mud turbine motors have a limited pressure capacity, because the internal pressure must be supported by the motor bearings. This pressure leads to high bearing loads, and wear when the bit is off-bottom.

It would be desirable to provide an improved drill motor capable of operating at an ultra-high rotary speed (i.e., well over 1000 rpm).

SUMMARY

This application specifically incorporates by reference the disclosures and drawings of each patent application and issued patent identified above as a related application.

The concepts disclosed herein encompass a turbine drill motor capable of operation at ultra-high rotary speeds (i.e., in excess of 1000 rpm, which is very high for turbine drill motors), with a high-pressure jet-assist functionality for drilling and well service applications. The ultra-high rotary speed enables fast penetration with diamond bits, while the high-pressure jet-assist ensures adequate cooling and cuttings removal. In an exemplary embodiment, such a turbine drill motor includes a bypass to divert a portion of the driving fluid supply when the bit is off-bottom, to limit the no-load runaway speed of the turbine.

The rotary speed of a conventional turbine motor is at a maximum (or runaway speed) when there is no drilling load applied. Maximum turbine power occurs when sufficient load is applied to slow the turbine to about one-half of the runaway speed. The turbine bearings must operate reliably when the bit is off-bottom, which places substantial demands on the bearings. The concepts disclosed herein limit the speed of the turbine when off-bottom, substantially reducing the maximum speed and the wear on the bearings. The concepts disclosed herein also encompass a pressure balance mechanism that reduces bearing loads, and enables the use of simple thrust bearings, in place of more complex and less reliable roller bearing assemblies used in conventional turbine motors for drilling. In many of the embodiments disclosed herein, the drilling thrust load is supported by a small diameter central bearing that is able to operate at a higher speed than a conventional annular bearing, because the maximum sliding speed is much smaller than conventional annular bearing. Finally, the pressure balanced seals allow operation of the turbine at much higher internal pressure, which allows higher torque and speed for a given motor length, and allows for high-pressure jet-assisted drilling.

In each turbine drill motor embodiment disclosed herein, the turbine includes a plurality of rotors disposed in a housing. When a flow of pressurized fluid in the housing engages those rotors, the turbine rotates. Significantly, the turbine can move axially relative to the housing. The axial motion of the turbine is controlled by forces applied to the turbine. A first force (referred to herein as a first axial mechanical load) generally causes the turbine to move downward (toward a distal end of the housing), due to the weight of a drill bit attached to a distal end of the turbine, and any hydraulic pressure (for example, due to a column of pressurized fluid in the drillstring above the turbine). A second force (referred to herein as a second axial mechanical load), which generally causes the turbine to move upward (toward a proximal end of the housing), is due to contact between the drill bit attached to the distal end of the turbine and an object obstructing the drill bit (such as an obstruction in a borehole, including rock and/or sediment at the bottom of a borehole). When the first force is larger than the second force, the turbine moves downward relative to the housing (i.e., toward the distal end of the housing), and a bypass vent is uncovered, so that pressurized fluid in the housing that would otherwise be used to rotate the turbine is discharged into an ambient environment. When the second force is larger than the first force, the turbine moves upward relative to the housing (i.e., toward the proximal end of the housing), and the bypass vent is covered, so that pressurized fluid in the housing engages the turbine rotors to rotate the turbine.

Thus, one aspect of the concepts disclosed herein is a method for automatically controlling a speed of a turbine motor for use in drilling and bore hole servicing. The method includes the step of introducing a pressurized fluid into the turbine motor to exert a first axial mechanical load on a rotor element of the turbine motor, the first axial mechanical load causing the rotor element to move to a first position in which at least a portion of the pressurized fluid introduced into the turbine motor is diverted away from the rotor element, the diversion of the fluid automatically reducing a speed of said turbine motor. The method further includes the step of moving the turbine motor so that the turbine motor engages a physical object that exerts a second axial mechanical load on the rotor element of the turbine motor, the second axial mechanical load being opposed to the first axial mechanical load and being greater in magnitude, the second axial mechanical load causing the rotor element to move to a second position in which at least a portion of the pressurized fluid that is diverted when the rotor element is in the first position is used to energize the turbine motor, thereby automatically increasing a speed of said turbine motor.

Another aspect of the concepts disclosed herein is an axial flow rotary turbine motor incorporating a rotor shaft that is free to move axially between an upper and lower position in response to an axial mechanical load, such that under a first mechanical loading condition, said rotor shaft moves into said upper position and sealingly engages an upper mechanical face seal. Note the first mechanical loading condition results when the second axial mechanical load discussed above is greater than the first axial mechanical load discussed above (i.e., the rotor shaft moves upward, toward a proximal end of the housing). The internal turbine pressure is sealed by the upper mechanical face seal, which also supports the axial load. The axial flow rotary turbine motor also includes a pressure balanced lower mechanical face seal rotatingly engaging the rotor shaft. The lower mechanical face seal supports the rotor shaft when the rotor shaft is in the lower position, in response to a second mechanical loading condition. Note the second mechanical loading condition results when the first axial mechanical load discussed above is greater than the second axial mechanical load discussed above (i.e., the rotor shaft moves downward, toward a distal end of the housing). The axial flow rotary turbine motor includes a bypass channel diverting fluid away from the rotor shaft when the rotor shaft is in the lower position, the diverted fluid reducing a speed of said turbine motor. In exemplary embodiments, the rotor shaft is attached to a distal drill bit. In one related embodiment, the axial flow rotary turbine motor includes fluid passages that define a parallel configuration, in which a first portion of the pressurized fluid in the axial flow rotary turbine motor is used to rotate the turbine before being discharged from the axial flow rotary turbine motor distally of the turbine rotors, and a second portion of the pressurized fluid in the axial flow rotary turbine motor is discharged from at least one fluid jet nozzle in the drill bit without being used to rotate the turbine. In another related embodiment, the axial flow rotary turbine motor includes fluid passages that define a serial configuration, in which all of the pressurized fluid flow is used to rotate the turbine (except for fluid passing through the bypass passage).

Yet another aspect of the concepts disclosed herein is an apparatus for drilling and bore servicing applications, including a housing defining a fluid path for a pressurized fluid, a drill bit disposed distally of the housing (the drill bit including at least one cutting element and at least one fluid jet nozzle), and a turbine disposed coaxially within the housing. The turbine includes a plurality of rotors, a proximal end and a distal end. The turbine is configured to rotate relative to the housing and to move axially relative to the housing in response to an axial mechanical load. The apparatus includes a first fluid path configured to direct fluid through the plurality of turbine rotors, thereby causing the turbine to rotate, and a second fluid path configured to direct fluid that has moved through the plurality of rotors to an exit port proximate the distal end of the turbine. The apparatus also includes a fluid bypass channel coupling a portion of the fluid path defined by the housing to an ambient environment, as a function of an axial position of the turbine relative to the housing, where the portion is disposed proximal of the turbine rotors. The apparatus includes an upper mechanical face seal disposed proximal of the turbine rotors, such that the turbine sealingly engages the upper mechanical face seal when the bit interacts with the material being cut (i.e., when the second axial mechanical load discussed above is greater than the first axial mechanical load). When the second axial mechanical load causes the turbine to move relative to the housing to sealingly engage the upper mechanical face seal, pressurized fluid in the housing is not diverted through the bypass channel. When the total axial mechanical load causes the turbine to move relative to the housing such that a gap exists between the turbine and the upper mechanical face seal (i.e., when the second axial mechanical load discussed above is smaller than the first axial mechanical load), pressurized fluid in the housing is diverted through the bypass channel, reducing an amount of fluid flow through the turbine. The apparatus also includes a pressure balanced lower mechanical face seal. The lower mechanical face seal rotatingly engages the turbine regardless of the total axial mechanical load (i.e., regardless of which of the first and second axial mechanical loads discussed above is greater in magnitude), while allowing the turbine to move axially in response to the total axial mechanical load. The lower mechanical face seal further supportingly engages the turbine when the first axial mechanical load discussed above is greater than the second axial mechanical load (i.e., when the gap is open and fluid bypasses the turbine rotors).

Also disclosed herein is a method for automatically controlling a speed of a turbine motor for use in drilling and bore hole servicing. The method automatically increases or decreases the speed of the turbine motor based on axial mechanical loads experienced by the turbine motor. The method includes the step of decreasing turbine motor speed by introducing a pressurized fluid into the turbine motor to exert a first axial mechanical load on a rotor element of the turbine motor. The first axial mechanical load causes the rotor element to move to a first position, in which at least a portion of the pressurized fluid introduced into the turbine motor is diverted away from the rotor element, thereby automatically reducing a speed of said turbine motor. The method also includes the step of increasing turbine motor speed, by moving the turbine motor so that the turbine motor engages a physical object that exerts a second axial mechanical load on the rotor element of the turbine motor. When the second axial mechanical load is opposed to and greater in magnitude than the first axial mechanical load, the second axial mechanical load causes the rotor element to move to a second position, in which at least a portion of the pressurized fluid that is diverted when the rotor element is in the first position is used to energize the turbine motor, thereby automatically increasing a speed of said turbine motor.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

The jet turbodrill disclosed herein is designed to operate at a significantly higher differential pressure, but a similar flow rate, as compared to a conventional mud turbine drill motor. The increased pressure provides higher power and speed.

Figure 1:
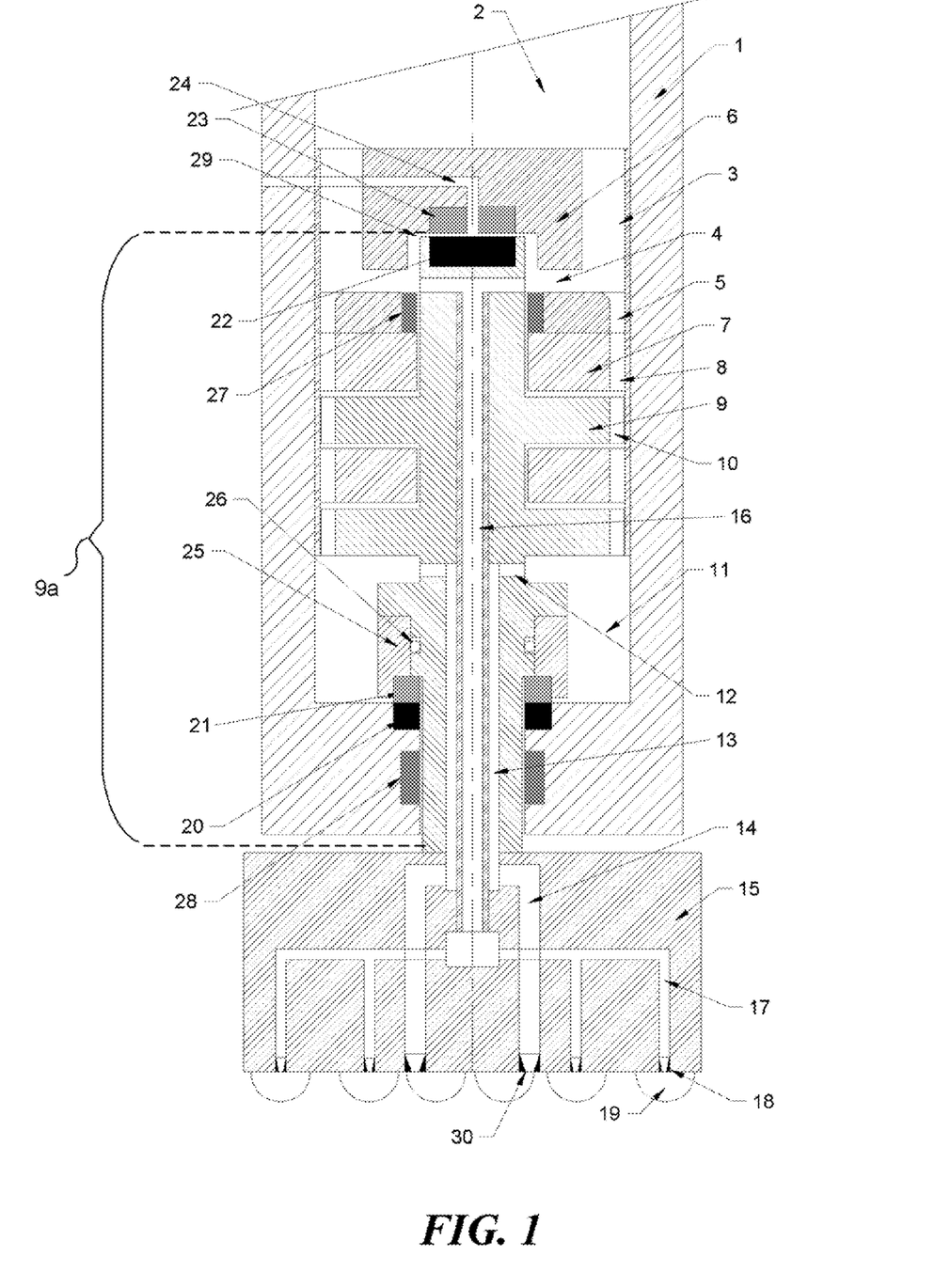
FIG. 1 is a cross-sectional side view of a first exemplary embodiment of a jet turbodrill based on a parallel fluid flow, with the drill bit off-bottom, and fluid being diverted through a bypass channel to reduce an amount of fluid passing through a fluid turbine portion of the jet turbodrill.

FIG. 1 is a cross-sectional side view of a first exemplary embodiment of a jet turbodrill based on a parallel fluid flow, showing the bit off-bottom. The turbodrill is enclosed in a housing 1 that is fixed to the end of a drillstring, which provides fluid at a constant flow rate to an inlet cavity 2. The fluid may be water, drilling mud, oil based fluid, gas, or a comingled fluid. The fluid is directed through passages 3 in an upper manifold 6, which is fixed to the housing. The fluid flow is split between passages 4 and 5 in the manifold. A portion of the flow is used to power the turbine while the remaining flow is directed to high-pressure jets in the bit.

Figure 2:
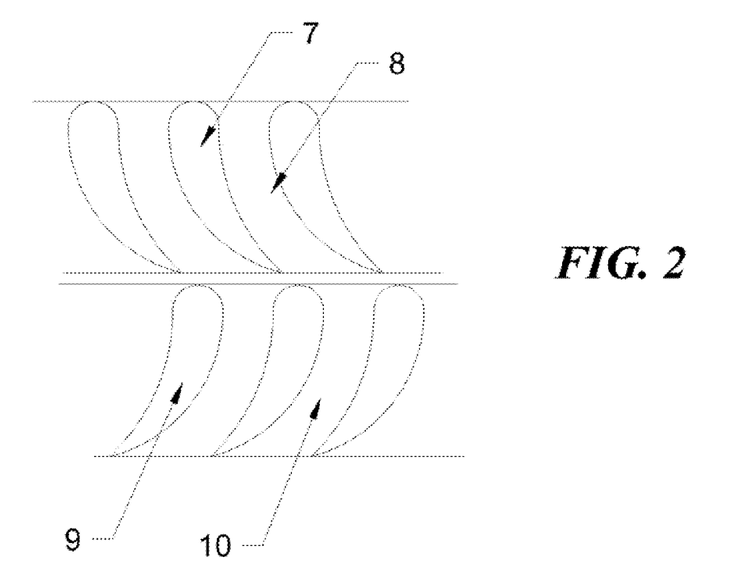
FIG. 2 schematically illustrates an exemplary rotor and stator configuration for the jet turbodrill of FIG. 1.

Flow through passage 5 is directed through a stator 7, which incorporates vane passages 8 that impart an angular motion to the fluid. The angular flow is directed into vane passages 10 fixed to a rotor 9 portion of a turbine 9a. Those skilled in the art will readily recognize that the angular flow generates a motive force on the turbine vanes that powers the turbine rotation. For simplicity, FIG. 1 illustrates only two stator and rotor stages, though it should be recognized that a larger number of stages may be employed, thus the number of stator and rotor stages shown in FIG. 1 are intended to be exemplary, and not limiting. A side view of the stator and rotor vanes is provided in FIG. 2. A wide variety of stator and rotor vane configurations can be beneficially employed, thus the illustrated stator and rotor vane configurations are intended to be exemplary, and not limiting. Referring to FIG. 2, note the Figure shows vane portions of stator 7 and rotor 9, and vane passages 8 and 10.

Figure 3:
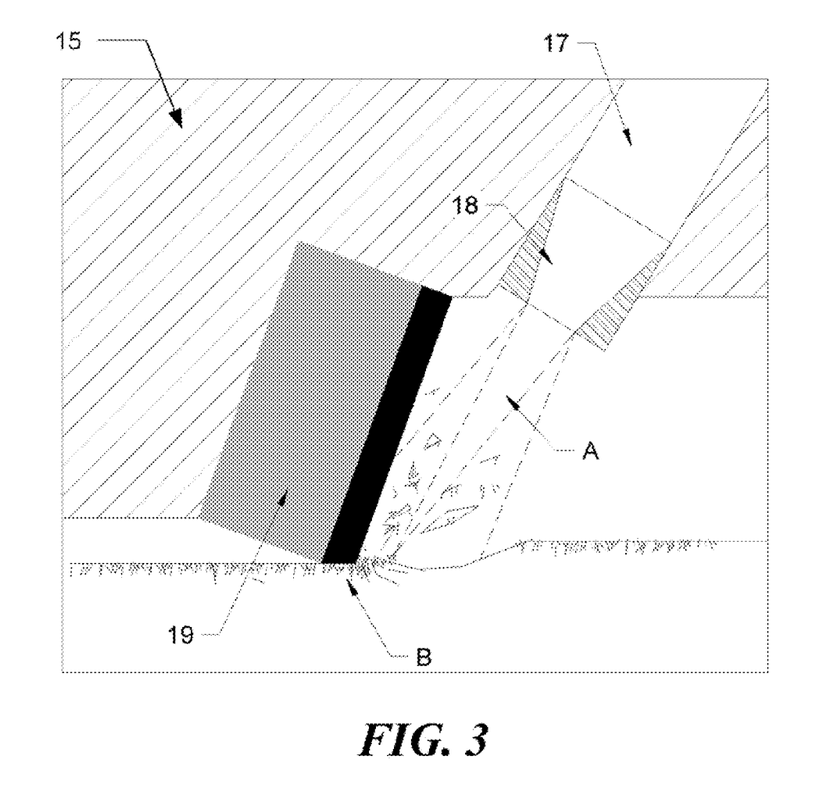
FIG. 3 schematically illustrates the jet turbodrill of FIG. 1 engaging a rock face, showing the operation of the cutting faces and the fluid jets.

The turbine exhaust flow is directed through passages 12, 13 and 14 to a face of a drill bit 15. Fluid ported above the turbine through passages 4 is directed through passages 16 and 17 to jet nozzles 18, which represent a flow restriction. The high-pressure flow from jet nozzles 18 is directed ahead of cutters 19. A side view of the cutter and jet is shown in FIG. 3. Referring to FIG. 3, a jet A is directed at a point B, which is directly ahead of the cutter/rock interface. Referring to FIG. 1, note that passages 14 and 17 are isolated from one another, such that fluid in passage 14 cannot enter passage 17. It should also be understood that passage 24, extending from a central axis of the housing to the opening in the housing through which fluid is discharged into the ambient environment, is similarly isolated from passage 3.

Note that the embodiment of FIG. 1 is referred to as a parallel flow embodiment, because fluid entering the tool via inlet cavity 2 is separated into two parallel fluid flow paths. A first fluid path is defined by passages 4, 16, and 17. The first fluid path diverts fluid past the turbine, and the diverted fluid is discharged through jet nozzles 18. A second fluid path is defined by passages 5, 12, 13, and 14. The second fluid path directs fluid through the turbine, and once past the turbine the fluid is discharged through jet nozzles 30. In some, but not all embodiments, nozzles 30 represent a flow restriction.

The radial loads in the tool of FIG. 1 are supported by radial bearings 27 and 28. Exemplary bearing types include sealed roller bearings and plain journal bearings, depending on the operating requirements of the motor. The pressure and drilling loads in the jet turbodrill are supported by lower seal rings 20 and 21, as well as upper seal 22 and upper seal ring 23 (also collectively referred to as an upper mechanical face seal). The seal and seal rings are preferably constructed from low-friction, hard, erosion and abrasion resistant materials such as polycrystalline diamond and/or silicon carbide. When off-bottom, the turbine and bit move downward (i.e., the turbine moves toward a distal end of the housing) so that all pressure loads are supported by the lower seal pair. A gap 29 opens in the upper seal pair, allowing flow to vent through a passage 24, thereby relieving flow and pressure through the motor, so that the motor idles and the loads on the upper and lower seal pair are limited. In an exemplary, but not limiting embodiment, the dimensions and flow rates provided by this bypass reduces the runaway rotary speed by at least a factor of two.

Referring to volume 11, note that this volume ports the flow from the bottom rotor passage (i.e., passage 10) to the turbine shaft passage (i.e., passage 12).

Figure 4:
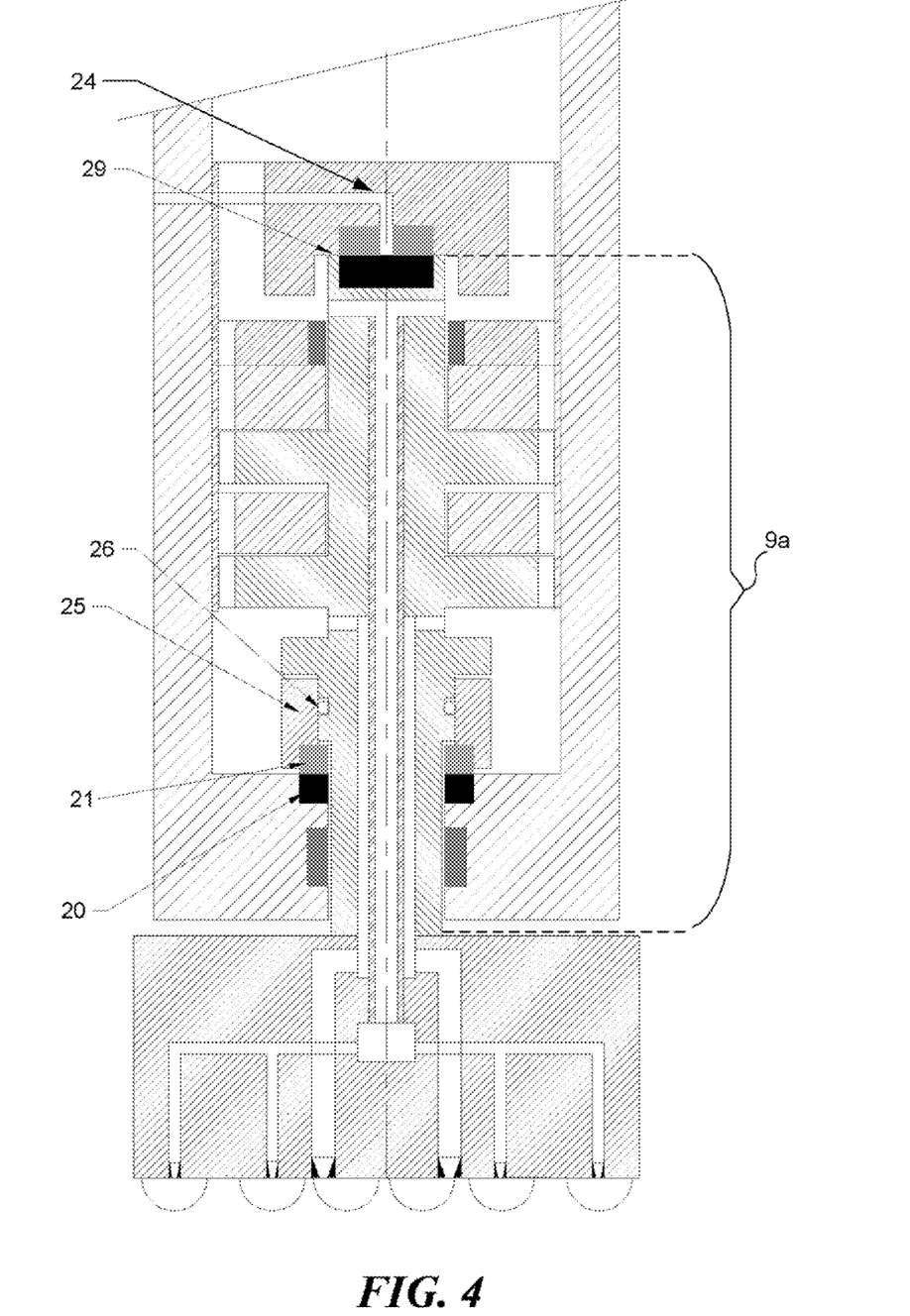
FIG. 4 is a cross-sectional side view of the parallel fluid flow jet turbodrill of FIG. 1, with the drill bit on-bottom, such that the fluid bypass channel is sealed, to increase an amount of fluid passing through a fluid turbine portion of the jet turbodrill.

FIG. 4 is a cross-sectional side view of the parallel fluid flow jet turbodrill of FIG. 1, with the drill bit on-bottom, such that fluid bypass passage 24 is sealed, to increase an amount of fluid passing through a fluid turbine portion of the jet turbodrill. Thus, FIG. 4 shows the turbodrill while drilling (i.e., when the bit engages a surface that applies a mechanical axial load). Bit thrust causes the turbine shaft to move up, closing gap 29 in the upper seal pair, and allowing turbine pressure to build. Lower seal ring 21 is mounted on a carrier 25 that slides on the turbine shaft with an O-ring 26 that maintains a high-pressure seal. As gap 29 closes, the downward pressure force on the turbine and bit increases to balance the thrust. The pressure balance can be adjusted by modifying the diameters of the seal rings and inner diameter of the carrier. With respect to the elements related to sealing a distal portion of the turbine 9a (i.e., seal ring 20, seal ring 21, carrier 25 and O-ring 26, collectively referred to as the lower mechanical face seal), note that under all conditions such elements seal the turbine to the housing while enabling the turbine to rotate relative to the housing, and when the drill bit is off-bottom, carrier 25 supports turbine 9a. With respect to FIG. 4, certain of the reference numerals shared in common with FIG. 1 have been omitted to simplify the Figure.

Figure 5:
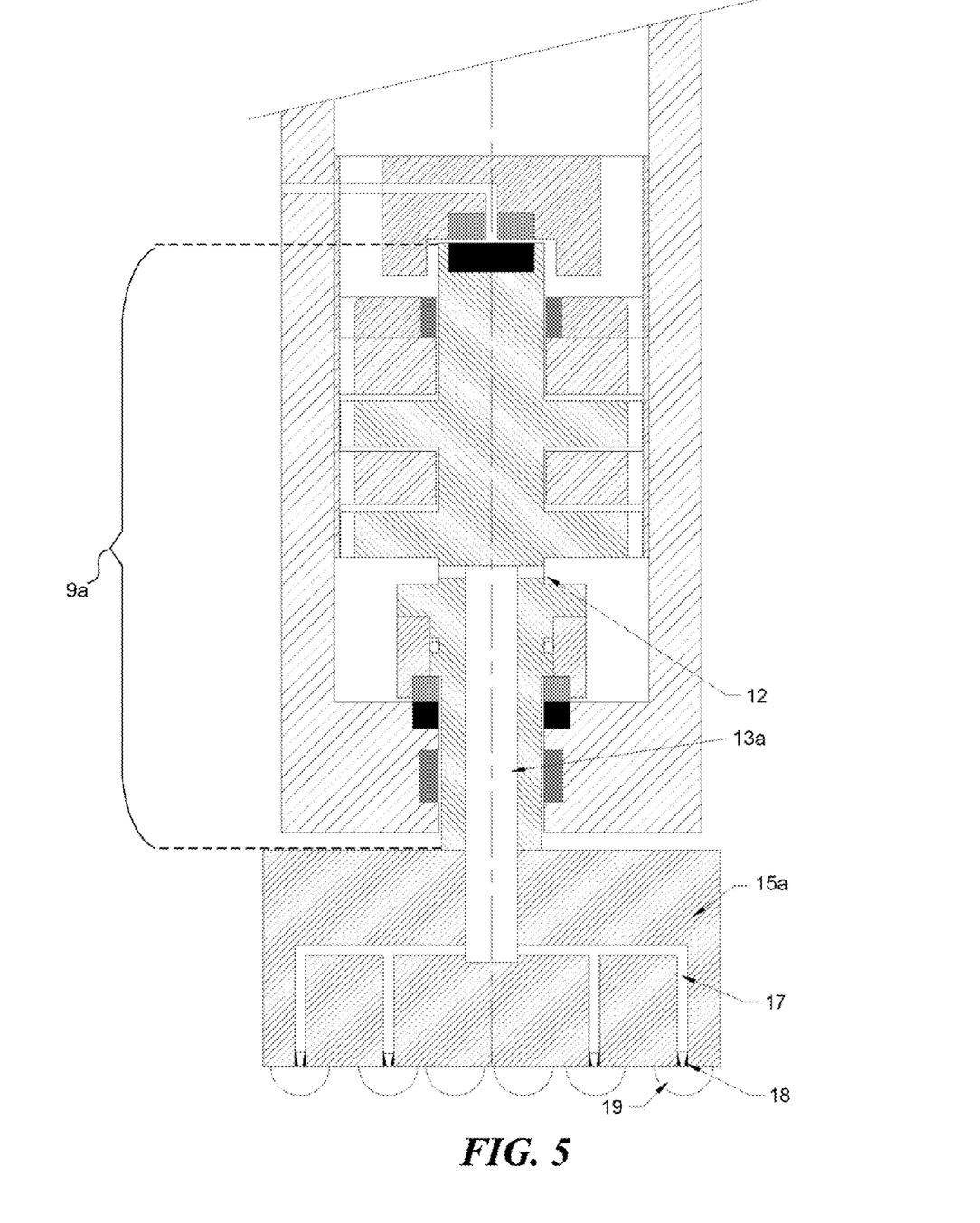
FIG. 5 is a cross-sectional side view of a second exemplary embodiment of a jet turbodrill based on a serial fluid flow, with the drill bit off-bottom, and fluid being diverted through a bypass channel to reduce an amount of fluid passing through a fluid turbine portion of the jet turbodrill.

FIG. 5 is a cross-sectional side view of a second exemplary embodiment of a jet turbodrill based on a serial fluid flow, with the drill bit off-bottom, and fluid being diverted through a bypass channel to reduce an amount of fluid passing through a fluid turbine portion of the jet turbodrill. Once again, certain of the reference numerals shared in common with FIG. 1 have been omitted to simplify the Figure. In this embodiment, the exhaust flow from the turbine is directed through passages 12, 13a and 17 to jet nozzles 18 in bit 15a. In this serial flow embodiment, all of the flow is directed through the high-pressure nozzles (jet nozzles 18), but the pressure differential is split between the turbine and the jet nozzles. This serial flow embodiment is simpler than the parallel flow embodiment of FIGS. 1 and 4, but the fluid jet pressure differential is lower for a given flow rate and available pressure at the tool inlet. Comparing the parallel flow embodiment of FIG. 1 with the serial flow embodiment of FIG. 5, note that the embodiment of FIG. 5 includes a modified bit 15a that does not include jet nozzles 30 or passages 14 shown in FIG. 1 (the parallel flow embodiment). Furthermore, passages 13 and 16 of the parallel flow embodiment (see FIG. 1) have been combined into a single passage 13a in the serial flow embodiment of FIG. 5. The bearing, seals and bypass passage (i.e., channel 24) function the same in the serial flow embodiment (see FIG. 5) as they do in the parallel flow embodiment (see FIG. 1).

Figure 6:
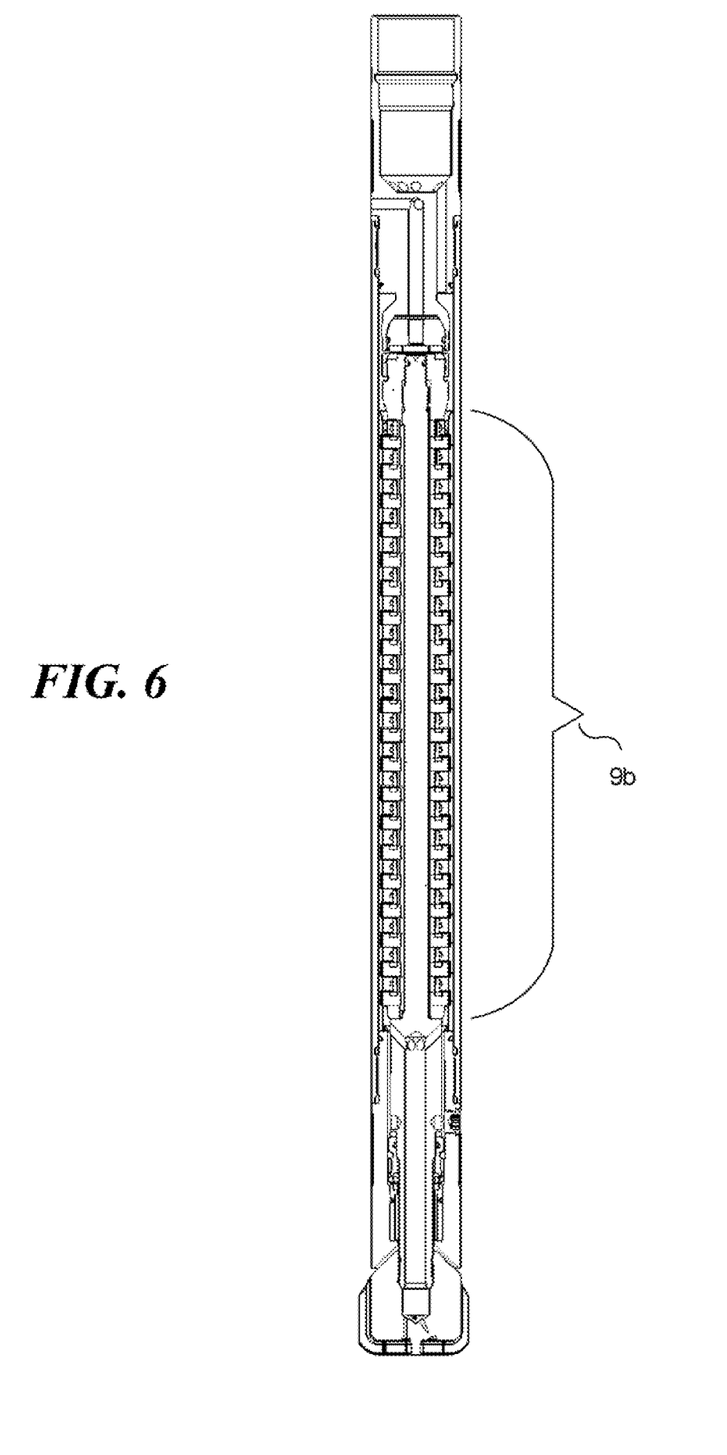
FIG. 6 schematically illustrates a serial flow embodiment including a larger turbine rotor element than shown in FIG. 5.

FIG. 6 schematically illustrates a serial flow embodiment including a larger turbine rotor element than shown in FIG. 5. A rotor 9b portion of the turbine in FIG. 6 includes 20 stages, as opposed to the 2 stages shown in FIG. 5. As noted above, the relative numbers of turbine stages shown in the Figures (for both the serial and parallel flow embodiments) are simply exemplary, and are not limiting on the concepts disclosed herein. With respect to FIG. 6, certain of the reference numerals shared in common with FIGS. 1 and 5 have been omitted to simplify the Figure.

Figure 7A:
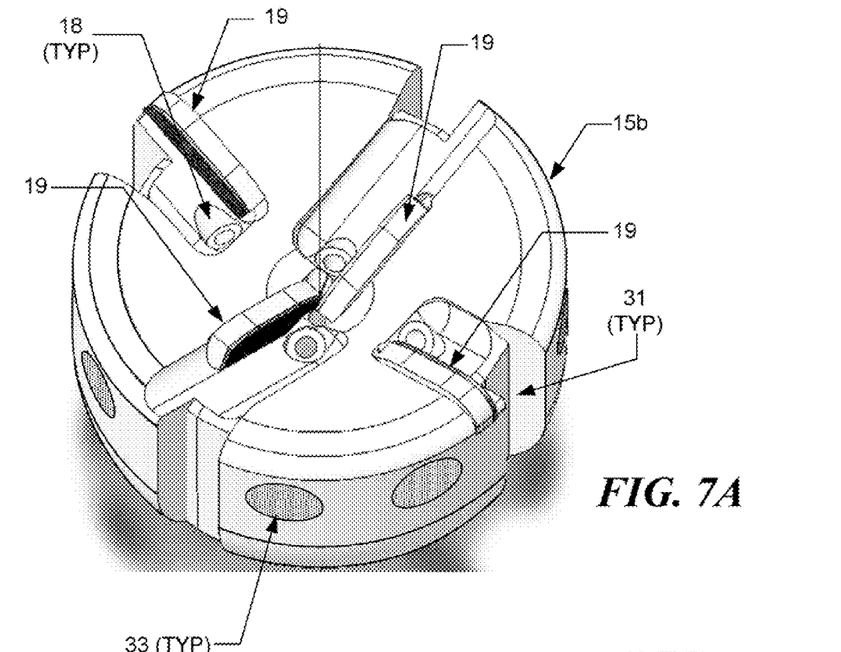
FIGS. 7A and 7B schematically illustrate exemplary jet-assisted drilling bits that can be used with the serial and parallel flow turbodrills disclosed herein.
Figure 7B:
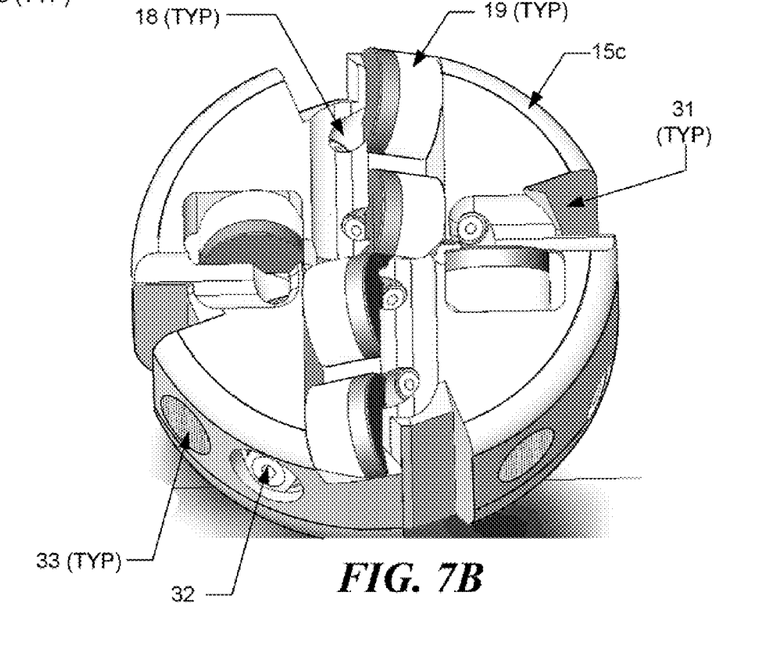

FIGS. 7A and 7B schematically illustrate exemplary jet-assisted drilling bits that can be used with the serial and parallel flow turbodrills disclosed herein.

FIG. 7A schematically illustrates an exemplary jet-assisted drilling bit designed for milling well obstructions. Cutters 19 are preferably made from thermally stabilized polycrystalline diamond compacts, or cubic boron nitride compacts, which are brazed onto a steel body forming bit 15b. Disposed adjacent to each of the four cutters on this bit is a fluid jet nozzle 18 configured to direct a fluid jet at a point of contact between the cutter and the material being cut. Each fluid jet nozzle 18 is configured to direct a fluid jet that is angled radially outwards, so that the fluid jet washes across the face of the cutter, to sweep cuttings to a periphery of bit 15b. Junk slots 31 are incorporated into the periphery of bit 15b to allow the cuttings to pass. Carbide buttons 33 disposed on the periphery provide resistance to wear of the steel body of bit 15b.

FIG. 7B schematically illustrates an exemplary jet-assisted drilling bit including six cutters 19, each with a jet nozzle 18 discharging a fluid jet for cutter cooling. The cutters are preferably made from thermally stabilized polycrystalline diamond compacts that are brazed onto a steel body forming bit 15c. The use of the steel body facilitates the incorporation of high pressure fluid ports feeding the jet nozzles (for example, see passages 17 in FIGS. 1 and 5). Bit 15c includes optional side firing jet nozzles 32 for milling material, such as mineral scale or cement, inside of a tube that is larger than the bit. The side firing jets erode any material left uncut by the mechanical cutters. Junk slots 31 are incorporated into the periphery of bit 15c to allow the cuttings to pass. Carbide buttons 33 disposed on the periphery provide resistance to wear of the steel body of bit 15c.

Reference has been made above to the concept of pressure balancing the turbine, so that in response to an applied axial mechanical load, the turbine moves axially in the housing to cover or uncover the bypass (i.e., passage 24 of FIG. 1). The balancing concept is discussed below in detail.

Figure 8A:
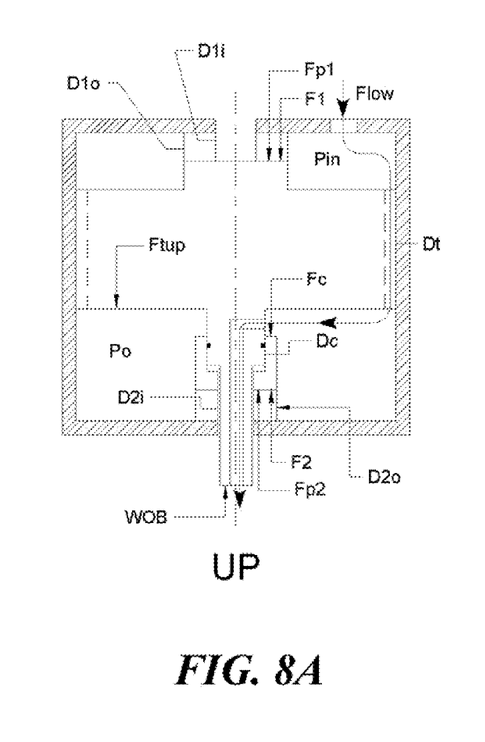
FIGS. 8A and 8B schematically illustrate forces acting on the pressure balanced turbine rotor in the turbodrills disclosed herein.
Figure 8B:
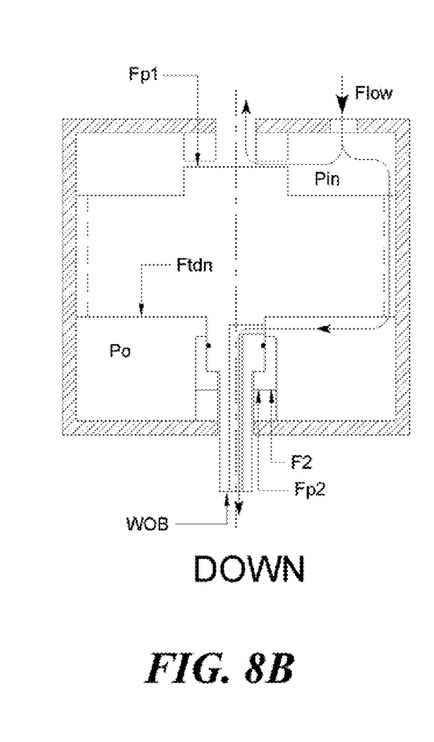

The pressure forces on the turbine and bearings are illustrated in FIGS. 8A and 8B. The pressure force on the seals is determined by the pressure distribution from the outside to the inside of the seal. The pressure forces are related to the seal's inner and outer diameters indicated by subscripts i for inner and o for outer diameter. $P_{in}$ is the pressure at the inlet to the turbine and $P_o$ is the pressure at the turbine outlet.

$$F_{p1} = \frac{\pi}{4} P_{in}\left[D_{1o}^2 - \frac{D_{1o}^2 - D_{1i}^2}{2\ln(D_{1o}/D_{1i})}\right]$$

$$F_{p2} = \frac{\pi}{4} P_o\left[D_{2o}^2 - \frac{D_{1o}^2 - D_{1i}^2}{2\ln(D_{1o}/D_{1i})}\right]$$

The downward pressure forces on the turbine are:

$$F_{tup} = \frac{\pi}{4} P_{in}(D_t^2 - D_{1o}^2) - \frac{\pi}{4} P_o(D_t^2 - D_c^2)$$

$$F_{tdn} = \frac{\pi}{4} P_{in}(D_t^2 - D_{1o}^2) - \frac{\pi}{4} P_o(D_t^2 - D_{2o}^2)$$

$$F_c = \frac{\pi}{4} P_o(D_{2o}^2 - D_c^2)$$

where (1) $F_{tup}$ is the force on the turbine when the upper seal is in contact and the lower seal is floating; $F_{tdn}$ is the force on the turbine when the upper seal is open and the turbine is in contact with the seal carrier, and $F_c$ is the lower seal carrier pressure force.

The pressure forces are added to determine the mechanical contact forces on the upper and lower seals. The mechanical contact force, $F_1$, on the upper seal ring is:

$F_1 = \text{WOB} - F_{tup} - F_{p1}$, where WOB is the weight on the bit.

The mechanical contact force $F_2$ on the lower seal ring is:

$F_2 = -\text{WOB} + F_{tdn} - F_{p2} + F_{p1}$ if $F_1 > 0$ $F_2 = F_c - F_{p2}$ if $F_1 \leq 0$ The mechanical contact forces are used to determine seal torque, $M_{tb}$, as follows:

$$M_{tb} = \frac{1}{4}\mu[F_1(D_{1o} + D_{1i}) + F_2(D_{2o} + D_{2i})],$$

where $\mu$ is the seal friction coefficient, assumed to equal 0.1 for diamond and silicon carbide.

The seal friction torque $M_{tb}$ and bit reaction torque $M_{bit}$ are used to find the speed of the turbine from the following relationship:

$$N = N_x\left(1 - \frac{M_{bit} + M_{tb}}{M_{stall}}\right)$$

where $N_x$ is the turbine runaway speed and $M_{stall}$ is the stall torque calculated from the turbine design parameters.

The bearing loads and torque are functions of the turbine differential pressure, $\Delta P_t(N)$, which varies with the turbine speed, as follows:

$P_{in} = P_o + \Delta P_t(N)$.

An iterative calculation procedure is used to arrive at a solution for rotational speed as a function of bit weight. The seal diameters can then be adjusted to control the weight on bit at which the turbine moves to the upwards position. This WOB is preferably chosen to be about half the WOB at which the bit will stall. The seal diameters are chosen to ensure that the sliding pressure-velocity product on the seal surfaces is smaller than the pressure-velocity product limit for the materials used. In an exemplary, but not limiting embodiment, the following diameters are selected.

| Seal Diameters | | inch |
|---|---|---|
| Upper | D1i | 0.8 |
| | D1o | 1.00 |
| | gap | 0.025 |
| Lower | D2i | 0.707 |
| | D2o | 0.78 |
| Carrier | Dc | 0.74 |

For such an exemplary embodiment, the pressure and speed of the turbine are as follows.

| Turbine Pressure Drop | 1268 | psid |
|---|---|---|
| Jet Pressure Drop | 2309 | psid |
| Total Pressure Drop | 3577 | psid |
| Maximum Rotary Speed | 6249 | rpm |

One skilled in the art will recognize that the seal diameters may be chosen to accommodate a broad range of jetting pressures, turbine design parameters, and bit designs.

With respect to the pressure balancing discussion above, Pin refers to a first pressure balance volume and Po refers to a second pressure balance volume.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A fluid driven turbodrill for drilling and well servicing applications, comprising:
   a housing defining a fluid volume and a plurality of stators through which a flow of pressurized fluid can be directed;
   a pressure balanced turbine rotor, at least a portion of which is disposed coaxially within the housing, the turbine rotor including a proximal end and a distal end, the distal end being connected to drive a tool for drilling or well servicing, the turbine rotor being configured to rotate relative to the housing and to move axially relative to the housing, the turbine rotor having a plurality of rotor vanes configured to engage the flow of pressurized fluid, such that the flow of pressurized fluid causes the turbine rotor to rotate relative to the housing;
   a pressure balance volume defined by the housing and the turbine rotor, the pressure balance volume being disposed adjacent to the proximal end of the turbine rotor;
   a bypass channel configured to selectively place the pressure balance volume in fluid communication with an ambient volume, as a function of an axial position of the turbine rotor relative to the housing, the bypass channel being disposed so that an axial load applied to the turbine rotor as a result of the tool pressing against an external object moves the turbine rotor axially to a position within the housing that reduces the flow of pressurized fluid through the bypass channel, so that at least a portion of the pressurized fluid that was flowing through the bypass channel instead flows through the turbine rotor to rotatably drive the tool; and
   a first seal assembly disposed at a first location between the housing and the turbine and having separable proximal and distal portions and a second seal disposed at a second location between the housing and the turbine, the housing and turbine rotor adapted to accept a range of inner and outer first and second seal diameters, the seal diameters selectable to control a particular weight on bit at which the turbine moves to an upper position, the first seal proximal and distal portions configured to separate and form a gap as a function of an axial position of the turbine rotor relative to the housing, thereby placing the pressure balanced volume in fluid communication with an ambient volume.

2. The fluid driven turbodrill of claim 1, wherein the first diameter and the second diameter have been selected to ensure that a sliding pressure-velocity product on seal surfaces of the first and second seals is smaller than a pressure-velocity product limit for materials used to fabricate the first and second seals.

3. The fluid driven turbodrill of claim 1, wherein the first diameter and the second diameter have been selected to ensure that a first axial mechanical load required to cause the turbine rotor to move a first position in which the bypass channel is sealed is about one half of a second axial mechanical load required to cause the turbine rotor to move a second position in which the bypass channel is open.

4. The fluid driven turbodrill of claim 1, wherein the turbine rotor is rotatably supported by a plurality of thrust bearings disposed at:
   a first thrust bearing location disposed proximal of the plurality of rotor vanes; and
   a second thrust bearing location disposed distal of the plurality of rotor vanes.

5. A turbodrill motor for drilling and bore servicing applications, comprising:
   a housing defining a fluid volume and a plurality of stators through which a flow of pressurized fluid can be directed;
   a turbine including a plurality of rotors that are disposed coaxially within the housing, the turbine having a proximal end and a distal end, a distal end of the turbine being drivingly coupled to a tool for drilling or bore servicing, the turbine being configured to rotate the tool relative to the housing and to move axially relative to the housing in response to an axial mechanical load, wherein at least a portion of the axial mechanical load is caused by the tool pressing against an external object;
   a first fluid path configured to direct fluid through the plurality of rotors, thereby causing the turbine to rotate;
   a second fluid path configured to direct fluid that has moved through the plurality of rotors to an exit port proximate the distal end of the turbine;
   a fluid bypass channel coupling a portion of the fluid path defined by the housing to an ambient environment, as a function of an axial position of the turbine relative to the housing, the portion being disposed proximal of the rotors;
   an upper mechanical face seal assembly disposed at a first location between the housing and the turbine and having separable proximal and distal portions, the housing and turbine rotor adapted to accept a range of inner and outer upper mechanical face seal diameters, the seal diameters selectable to control a particular weight on bit at which the turbine moves to an upper position, the upper mechanical face seal proximal and distal portions configured to separate and form a gap as a function of an axial position of the turbine rotor relative to the housing, the upper mechanical face seal assembly configured to sealingly engages the turbine as a function of the axial mechanical load, such that:

when the tool presses against an external object, the portion of the axial mechanical load forces contributed by said contact causes the turbine to move relative to the housing so as to sealingly engage the upper mechanical face seal, and to interrupt the flow of pressurized fluid in the housing is not that was being diverted through the bypass channel, whereby at least a portion of the pressurized fluid that was flowing through the bypass channel is instead caused to flow through the plurality of rotors to enable the turbine to rotatably drive the tool; and when the axial mechanical load at times when the tool is not in contact with an external object causes the turbine to move relative to the housing such that a gap exists between the turbine and the proximal portion of the upper mechanical face seal, pressurized fluid in the housing is diverted through the bypass channel, reducing an amount of the pressurized fluid flow through the turbine and thereby reducing a rotary speed of the turbine; and a pressure balanced lower mechanical face seal disposed at a second location between the housing and the turbine, the housing and turbine rotor adapted to accept a range of inner and lower mechanical face seal diameters, the seal diameters selectable to control a particular weight on bit at which the turbine moves to an upper position, the lower mechanical face seal configured to rotatingly and sealingly engages the turbine regardless of the axial mechanical load, while allowing the turbine to move axially in response to the axial mechanical load.

6. The apparatus of claim 5, wherein each mechanical face seal is fabricated from a hard, erosion resistant, and low friction material.

7. The apparatus of claim 6, wherein the hard, erosion resistant, and low friction material comprises at least one of diamond and silicon carbide.

8. The apparatus of claim 5, further comprising: (a) wherein the tool comprises a drill bit attached to the distal end of the turbine, the drill bit including at least one cutting element and at least one fluid jet nozzle; and (b) further comprising at least one fluid path providing pressurized fluid from the housing to at least one fluid jet nozzle in the drill bit.

9. The apparatus of claim 8, wherein the at least one cutting element and at least one fluid jet nozzle on the drill bit are configured such that a fluid jet is directed at each cutting element.

10. The apparatus of claim 8, wherein the drill bit includes at least one side facing fluid jet nozzle.

11. The apparatus of claim 5, further comprising at least one fluid path that diverts fluid from a first location that is proximal of the rotors to a second location that is distal of the rotors, such that the diverted fluid is not used to rotate the turbine, thereby providing a parallel flow configuration.

12. The apparatus of claim 5, wherein fluid passages in the apparatus define a serial configuration, in which all pressurized fluid discharged from the housing distally of the turbine is used to rotate the turbine before being discharged from the housing.

13. An apparatus for drilling and bore servicing applications, comprising:

a housing defining a fluid volume and a plurality of stators through which a flow of pressurized fluid can be directed;

a drill bit disposed distally of the housing, the drill bit including at least one cutting element and at least one fluid jet nozzle;

a turbine including a plurality of rotors that are disposed coaxially within the housing, the turbine having a proximal end and a distal end coupled to drivingly rotate the drill bit, the turbine being configured to rotate relative to the housing and to move axially relative to the housing in response to an axial mechanical load resulting at least in part from the drill bit pressing against an external object;

a first fluid path configured to direct fluid through the plurality of rotors, thereby causing the turbine to rotate;

a second fluid path configured to direct fluid that has moved through the plurality of rotors to an exit port proximate the distal end of the turbine;

a fluid bypass channel coupling a portion of the fluid path defined by the housing to an ambient environment, as a function of an axial position of the turbine relative to the housing, the portion being disposed proximal of the rotors;

an upper mechanical face seal assembly disposed at a first location between the housing and the turbine and having separable proximal and distal portions, the housing and turbine rotor adapted to accept a range of inner and outer upper mechanical face seal diameters, the seal diameters selectable to control a particular weight on bit at which the turbine moves to an upper position, the upper mechanical face seal proximal and distal portions configured to separate and form a gap as a function of an axial position of the turbine rotor relative to the housing, the upper mechanical face seal assembly configured to sealingly engages the turbine as a function of the axial mechanical load, such that:

when the axial mechanical load resulting from the contact of the drill bit pressing against an external object causes the turbine to move relative to the housing to sealingly engage the upper mechanical face seal, at least a portion of pressurized fluid in the housing is not diverted through the bypass channel and is instead directed through the first fluid path to cause the turbine to rotate; and when the axial mechanical load only due to fluid pressure and not including a contribution resulting from the drill bit pressing against an external object, causes the turbine to move relative to the housing such that a gap exists between the turbine and the proximal portion of the upper mechanical face seal, and causes pressurized fluid in the housing to be diverted through the bypass channel, thus reducing an amount of fluid flow through the turbine and thereby reducing a rotary speed of the turbine; and a pressure balanced lower mechanical face seal disposed at a second location between the housing and the turbine, the housing and turbine rotor adapted to accept a range of inner and lower mechanical face seal diameters, the seal diameters selectable to control a particular weight on bit at which the turbine moves to an upper position, the lower mechanical face seal configured to rotatingly and sealingly engage the turbine regardless of the axial mechanical load, while allowing the turbine to move axially in response to the axial mechanical load.

14. The apparatus of claim 13, wherein fluid passages in the apparatus define a parallel configuration, in which a first portion of the pressurized fluid in the housing is used to rotate the turbine before being discharged from the housing distally of the rotors, and a second portion of the pressurized fluid from the housing is discharged from at least one fluid jet nozzle in the drill bit without being used to rotate the turbine.

15. The apparatus of claim 13, wherein fluid passages in the apparatus define a serial configuration, in which all pressurized fluid discharged from the housing distally of the turbine is used to rotate the turbine before being discharged from the housing.

16. An axial flow rotary turbine motor incorporating a rotor shaft that is free to move axially between an upper and lower position in response to an axial mechanical load, at least a portion of the axial mechanical load at times resulting from a tool rotatably driven by the turbine motor pressing against an external object, the turbine motor an rotor shaft configured such that when the mechanical axial load resulting from the contact of the tool with the external object causes the rotor shaft to move into the upper position, the rotor shaft sealingly engages an upper mechanical face seal assembly disposed at a first location between the housing and the turbine and having separable proximal and distal portions, the housing and turbine rotor adapted to accept a range of inner and outer upper mechanical face seal diameters, where the seal diameters are selectable to control a particular weight on bit at which the turbine moves to an upper position, the upper mechanical face seal proximal and distal portions are configured to separate and form a gap as a function of an axial position of the turbine rotor relative to the housing, whereby the upper mechanical face seal assembly is configured to close a bypass channel disposed at the upper mechanical face seal to prevent fluid being diverted away from the rotor shaft, and an internal turbine pressure is sealed by the upper mechanical face seal, the axial flow rotary turbine motor including a pressure balanced lower mechanical face seal disposed at a second location between the housing and the turbine, the housing and turbine rotor adapted to accept a range of inner and lower mechanical face seal diameters, where the seal diameters are selectable to control a particular weight on bit at which the turbine moves to an upper position, the lower mechanical face seal configured to rotatingly engage the rotor shaft, the lower mechanical face supporting the rotor shaft when the rotor shaft is in the lower position, the bypass channel diverting at least a portion of fluid away from the rotor shaft when the rotor shaft is in the lower position, the diverted fluid thereby reducing a speed of the turbine motor.

* * * * *